(12) United States Patent
Gossett et al.

(10) Patent No.: US 7,142,536 B1
(45) Date of Patent: Nov. 28, 2006

(54) COMMUNICATIONS NETWORK QUALITY OF SERVICE SYSTEM AND METHOD FOR REAL TIME INFORMATION

(75) Inventors: Carroll Philip Gossett, Mountain View, CA (US); Michial Allen Gunter, Fremont, CA (US)

(73) Assignee: Google, Inc., Mountain View, CA (US)

( * ) Notice: Subject to any disclaimer, the term of this patent is extended or adjusted under 35 U.S.C. 154(b) by 672 days.

(21) Appl. No.: 09/738,010

(22) Filed: Dec. 14, 2000

(51) Int. Cl.
*H04Q 11/04* (2006.01)
*H04J 3/08* (2006.01)

(52) U.S. Cl. ............... 370/360; 370/326; 370/363; 370/381; 370/384

(58) Field of Classification Search ......... 370/229, 370/235, 236, 237, 230, 231, 235.1, 236.1, 370/236.2
See application file for complete search history.

(56) References Cited

U.S. PATENT DOCUMENTS

| 6,091,725 | A | 7/2000 | Cheriton et al. | 370/392 |
| 6,173,331 | B1* | 1/2001 | Shimonishi | 709/232 |
| 6,501,733 | B1* | 12/2002 | Falco et al. | 370/235 |
| 6,522,656 | B1* | 2/2003 | Gridley | 370/428 |
| 6,563,793 | B1* | 5/2003 | Golden et al. | 370/236 |
| 6,611,519 | B1* | 8/2003 | Howe | 370/386 |
| 6,621,796 | B1* | 9/2003 | Miklos | 370/236 |

FOREIGN PATENT DOCUMENTS

| EP | 0 940947 A1 | 9/1999 |
| EP | 0940947 | 9/1999 |
| WO | 00/11838 | 3/2000 |
| WO | WO 00/11838 | 3/2000 |

OTHER PUBLICATIONS

Devalla b., et al.: "Adaptive connection admission control for mission critical real-time communication networks" Military Comm7nications conference, 1998 MILCOM 98. Proceedings, IEEE Boston, MA Oct. 18-21, 1998 NY, NY pp. 614-620.

(Continued)

*Primary Examiner*—Chi Pham
*Assistant Examiner*—Justin M. Philpott

(57) ABSTRACT

The present invention provides efficient and effective quality of service for information that is time sensitive (e.g., real time data). An intermediate network communication system and method (e.g., a router) of the present invention performs cut through switching to reduce latency problems for time sensitive information. In one embodiment of the present invention, communication packet header information is encoded with a time sensitive identifier that identifies the information as time sensitive. In one exemplary transfer control protocol/internet protocol TCP/IP implementation of the present invention, time sensitive indication is provided in the link layer information. In one embodiment of the present invention, time sensitive information is dropped if the intermediate network device can not communicate the information within specified timing constraints. In one embodiment of the present invention time sensitive information is cut through routed on a virtual channel and pre-empts non time sensitive information. In one embodiment a communication path probe is cut through routed via intermediate network devices to establish a communication path before other information is communicated from a originating source to a final destination. In one embodiment the present invention leverages previously collected information to establish a communication path. In one embodiment the present invention, an intermediate network device establishes a second communication link if a first communication link is unavailable.

14 Claims, 7 Drawing Sheets

OTHER PUBLICATIONS

Roche C. et al.; "Performance of congestion control mechanisms in wormhole routing networks", INFOCOM '97, Sixteen Annual Joint Conference of the IEEE Computer and Communications Societies, driving the Information Revolution., Proceedings IERE Kobe,Japan Apr. 7-11, 1997, Los Alamitos, CA pp. 1365-1372.

* cited by examiner

| 301 | 302 | 303 | 304 | 305 | 306 | 307 | 308 |
|---|---|---|---|---|---|---|---|
| Physical Layer Info. | Data Link Layer Info | Network Layer Info | Transport Layer Info | Session Layer Info | Presentation Layer Info | Application Layer Info | Tail Info |

Establishing a time sensitive pre-emption communication link.

492

Cut-through routing time critical information on a virtual channel.

FIG 4C

COMMUNICATIONS NETWORK QUALITY OF SERVICE SYSTEM AND METHOD FOR REAL TIME INFORMATION

BACKGROUND OF THE INVENTION

1. Field of the Invention

This invention relates to the field of network communications. In particular, the present invention relates to an efficient communications network quality of service system and method for real time information.

2. Related Art

Electronic devices and systems have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. These advantageous results are often realized and maximized through the use of distributed resources (e.g., electronic devices) that communicate via a network. The distributed resources are often end use devices (e.g., a personal computer, video device, telephone, etc.) coupled to a communications network and rely on information communicated over the network in the performance of their prescribed tasks (e.g., internet interface, movie presentation, or communication of a conversation). The quality of service a network management system and method provides often has a significant impact on the performance of the end use devices.

There are numerous different communications networks that transfer information in a variety of implementations. Typically a network is defined by its attributes and abilities such as the type of communication medium used (e.g., copper wires, fiber optics, coax cable, radio waves, microwaves, etc.), the cable layout (or topology), data transfer rates, communication protocols, and the method used by nodes to access and use the network (access methods). Usually there are a number of end use devices (e.g., personal computers, telephones, etc.) that are coupled together by communication mediums which convey information to a destination with the assistance of intermediate control devices (e.g., bridges, routers, gateways, switches, repeaters, cellular base stations, satellites, etc.). Some of the most popular types of networks comprise Ethernet (coaxial cable or twisted-pair cable), token ring, Fiber Distributed Data Interface (FDDI), Frame Relay, Integrated services Digital Network (ISDN), X.25, Synchronous Data Link Control (SDLC), high speed networks such as ATM and wireless (e.g., cellular telephony).

Quality of service measurements indicate a level of network performance criteria. There are usually a number of network characteristics that impact quality of service levels. For example, quality of service is often expressed in terms of latency requirements. Latency is the time delay involved in moving data traffic through a network. Several items affect latency including propagation delays, transmission delays and switching processing delays. Another important network attribute that impacts quality of service is bandwidth. Bandwidth is the amount of information that a network is capable of transmitting in a given period and the amount of bandwidth available is typically limited by network resources.

Generally, communication network resources are relatively expensive and it is not economical to build a network with enough bandwidth to instantaneously handle all possible information transmission requests under worst case scenarios. Communication networks built with the ability to handle the maximum possible communication load that all the end use and intermediate network devices could generate if they all tried to access the network at one time are usually inefficient. Therefore, most communication networks are built with limited resources and even though limiting communication network resources is economically efficient in many instances it does give rise to the need for a network management protocol to determine which of the limited network resources are utilized at what time for a communication of information.

Traditional network management protocols are often inadequate and do not provide effective quality of service. One type of buffer and forward traditional network management approach involves giving greater priority to some information and randomly dropping information if the buffers are full. While these approaches provide some quality or service benefits they also have significant detrimental side affects. For example, giving relatively greater priority to some information does not guarantee the information is going to arrive at its final destination in a timely manner (e.g., real time data arrives in real time) and not getting the information to its final destination in a timely manner frequently means the information is useless. Nevertheless, prior art approaches often buffer the information for later transmission and utilize bandwidth resource to transmit what is essentially useless information depriving useful information of that bandwidth.

The quality of service provided by a network management system and method usually has a significant impact on the performance of end use devises. To perform a particular task adequately typically requires a minimum quality of service. For example, if there is to much latency in some application transmission (e.g., a video presentation or voice communications) the user is not able to perceive (e.g., hear or perceive) an even stream of data. Not being able to receive a relatively even stream of data significantly impacts the practical benefits of the communications network. For example, if a voice conversation or a video presentation gets so choppy that a person can not understand what is being said or presented the communication is essentially useless from a practical standpoint.

One of the most common and prolific distributed resource systems that communicates real time information includes numerous inter-networked computers communicatively coupled together to form the Internet. Typically, computers coupled to the Internet communicate in a Transmission Control Protocol/Internet Protocol (TCP/IP), which divides information into packets and routes them to their destination identified by an IP address. Real time information and applications are prolifically distributed on the Internet. For example, player versus player video games users typically require real time information for the users to enjoy maximized pleasure of playing a game. The players typically make moves in response to moves by an opponent and if information is not real time the challenge of fast pass move and counter moves is significantly diminished or lost.

What is required is a system and method that provides efficient and effective quality of service for information that is time sensitive (e.g., real time data).

SUMMARY OF THE INVENTION

The present invention provides efficient and effective quality of service for information that is time sensitive (e.g., real time data). An time sensitive intermediate network communication system and method of the present invention performs cut through switching to reduce latency problems for time sensitive information. If the time sensitive network communication system and method can not communicate the time sensitive information to downstream devices within predetermined timing constraints the time sensitive information is dropped. In one embodiment of the present invention time sensitive information is sent to downstream devices by the cut through switching.

In one embodiment of the present invention a time sensitive quality of service management system and method provide efficient communication of time sensitive information (e.g., real time information). The time sensitive quality of service management system and method analyzes received information to determine if it is time sensitive. If the information is time sensitive it is forwarded via a cut through approach if the time sensitive quality of service management system and method is not busy performing other communication activities. In one embodiment of the present invention, time sensitive information is dropped if the intermediate network device can not communicate the information within specified timing constraints. For example, if real time data can not be communicated by the intermediate network device because it is busy performing a previous communication task the real time data is dropped. In one exemplary implementation of the present invention, time sensitive information is cut-through routed via a virtual communication channel. In one embodiment the virtual communication channel is reserved for time sensitive communications and in another embodiment the time sensitive communication pre-empts non-time sensitive communications which are resumable after the time sensitive communication is completed.

The present invention also includes a number of other network management capabilities that facilitate maximization of network resource utilization. In one embodiment of the present invention time critical information is not communicated until a communication path from the originating source to the final destination is established. In one exemplary implementation of the present invention the communication path is established by cut through routing a probe that comprises final destination information and probe path information. If a probe establishes a path to the final destination a probe update packet is returned to the originating source and time sensitive information is communicated to the final destination along the established path. In one embodiment the present invention also leverages previously collected information to establish a communication path. In one exemplary implementation of the present invention time sensitive quality of service network utilizes a "wormhole" process that utilizes a communication path that was previously established to communicate new information. In one embodiment the present invention, an intermediate network device establishes a second communication link if a first communication link is unavailable.

In one embodiment of the present invention, communication packet header information is encoded with a time sensitive identifier that identifies the information as time sensitive. In one exemplary transfer control protocol/internet protocol TCP/IP implementation of the present invention, the strict hierarchy of packet protocol configuration and handling is modified. In one exemplary implementation link layer (layer 2) devices analyze information in the transport layer (layer 4) to determine the identification of the end use destination device and if that device is a type of device that utilizes real time information the data in the packet is consider to be time sensitive. In another exemplary implementation of the present invention the link layer (layer 2) information is modified (e.g., by an originating source) to include a time sensitive identifier that identifies the information as time sensitive.

BRIEF DESCRIPTION OF THE DRAWINGS

FIG. 3 is a block diagram of a TCP/IP packet utilized in one embodiment of the present invention.

FIG. 4C is a flow chart of one embodiment of a present invention time sensitive virtual channel communication process.

DETAILED DESCRIPTION OF THE INVENTION

Reference will now be made in detail to the preferred embodiments of the invention, a time sensitive quality of service system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention is a time sensitive quality of service system and method that facilitates efficient and effective communication of time sensitive information. A time sensitive quality of service system and method of the present invention facilitates fast communication (e.g., cut through) of time sensitive information through a communication network. The time sensitive quality of service system and method also increases overall network communication performance by reducing the consumption of limited network bandwidth for communicating information that is essentially useless to an end use application.

Figure 1:
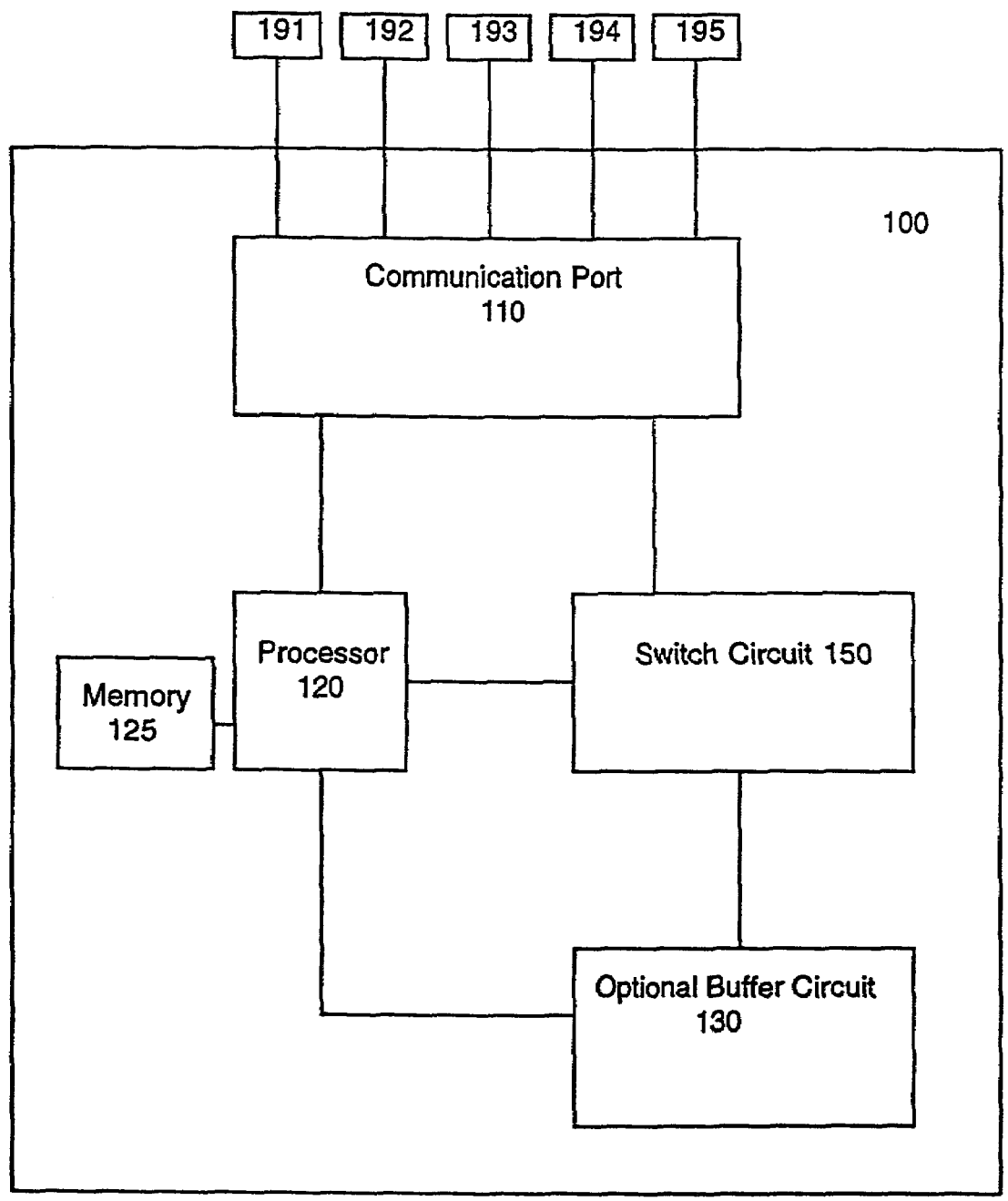
FIG. 1 is a block diagram of one embodiment of a present invention time sensitive quality of service management system.

FIG. 1 is a block diagram of a time sensitive quality of service management system 100, one embodiment of the present invention. Time sensitive quality of service management system 100 comprises a communication port 110, processor 120, memory 125, switching circuit 150 and optional buffer circuit 130. Communication port 110 is coupled to processor 120 and switch 150 which are coupled to one another. Optional buffer 130 is coupled to processor 120 and switch circuit 150. Memory 125 is coupled to processor 120. It is appreciated that time sensitive quality of service management system 100 comprises a variety of embodiments. In one exemplary embodiment of the present invention, communications port 110 comprises a thick ethernet auxiliary input (AUI) port and a plurality of ISDN WAN link ports. In one embodiment of the present invention in which time sensitive quality of service management system 100 is a wireless unit, communications port 110 comprises an antenna, a radio receiver and a radio transmitter.

The components of time sensitive quality of service management system 100 cooperatively operate to provide communications with high level quality of service. Communications port 110 receives and transmits information to and from a plurality of other network devices (e.g., such as device 191 through 195). Processor 120 controls the operations of time sensitive quality of service management system 100. Memory 125 stores information associated with the control of time sensitive quality of service management system 100 for processor 120. Switch circuit 150 provides an output communication path to communication port 110. Optional buffer 130 stores information temporarily when directed by processor 120 and the information is forwarded according to queuing characteristics of the buffer (e.g., FIFO, etc.)

In one embodiment of the present invention, time sensitive quality of service management system 100 utilizes cut through routing. As soon as a header of a communication packet is received processor 120 analyzes destination information included in the header and directs switching circuit 140 to begin forwarding the information to the appropriate destination. Time sensitive quality of service management system 100 does not buffer the information or wait for the entire packet to be received before transmitting it to the destination. In one embodiment of the present invention, the information is sent to other devices communicatively coupled to time sensitive quality of service management system 100. For example, information received from network device 191 is analyzed and if it is time sensitive (e.g., real time information) processor 120 directs switch circuit 150 to cut through forward the information to a network device (e.g., 192 through 195) without buffering the information.

In one embodiment of the present invention in which time sensitive quality of service management system 100 includes buffer and forward features it still provides quality of service features at the link layer. Processor 120 analyzes incoming information and determines if the incoming information has urgent timing characteristics (e.g., real time information). If the information does have urgent timing characteristics processor 120 directs switch circuit 120 to perform cut through routing and not buffer the information. Other non urgent (not time sensitive) information is buffered and forwarded later.

In one embodiment of the present invention, time sensitive quality of service management system 100 preemptively drops time sensitive information if the time sensitive information can not be communicated within predetermined timing constraints. As discussed above time, sensitive quality of service management system 100 analyzes incoming information to determine if the information has urgent timing characteristics (e.g., real time data). Processor 120 also determines if time sensitive quality of service management system 100 can perform the information communication within predetermine timing constraints (e.g., is not engaged in other communication activities). If the information does have urgent timing characteristics but time sensitive quality of service management system 100 can not perform the communication within predetermined timing constraints, processor 120 directs time sensitive quality of service management system 100 to drop the incoming information. In one exemplary implementation of the present invention, if time sensitive quality of service management system 100 is busy performing communication activities associated with previously received information, presently received time sensitive communication information is dropped. For example, if urgent characteristic information from a first end user device is received by time sensitive quality of service management system 100 and time sensitive quality of service management system 100 is already engaged in transmitting information for a second end user time sensitive quality of service management system 100 drops the urgent characteristic information from the first end user device.

In one embodiment of the present invention, time sensitive quality of service management system 100 establishes time sensitive pre-emption communication links via virtual channels of a communication network. In one embodiment of the present invention, there are a plurality of communication channels in a communication link to and from time sensitive quality of service management system 100. In one embodiment of the present invention, at least one of the communication channels is reserved for priority communication information. For example, a virtual communication channel is reserved for time sensitive information (e.g., real time information) and time sensitive quality of service management system 100 cut-through routs time sensitive information of the time sensitive reserved channel. Thus, downstream devices are more likely to be able to handle the time sensitive communication since it is only competing with other time sensitive information. In one exemplary embodiment, a pre-empted communication on the virtual channel is resumable.

In one embodiment of the present invention, a channel is not reserved exclusively for time sensitive information but other information is pre-empted by time sensitive information communications. For example, a channel may carry non-time sensitive information but when time sensitive quality of service management system 100 receives time sensitive information (e.g., real time information) the time sensitive information pre-empts the non-time sensitive information (e.g., is time sensitive quality of service management system 100 stops communicating the non-time sensitive information) and time sensitive quality of service management system 100 cut through routs on the time sensitive information on the channel.

Figure 2:
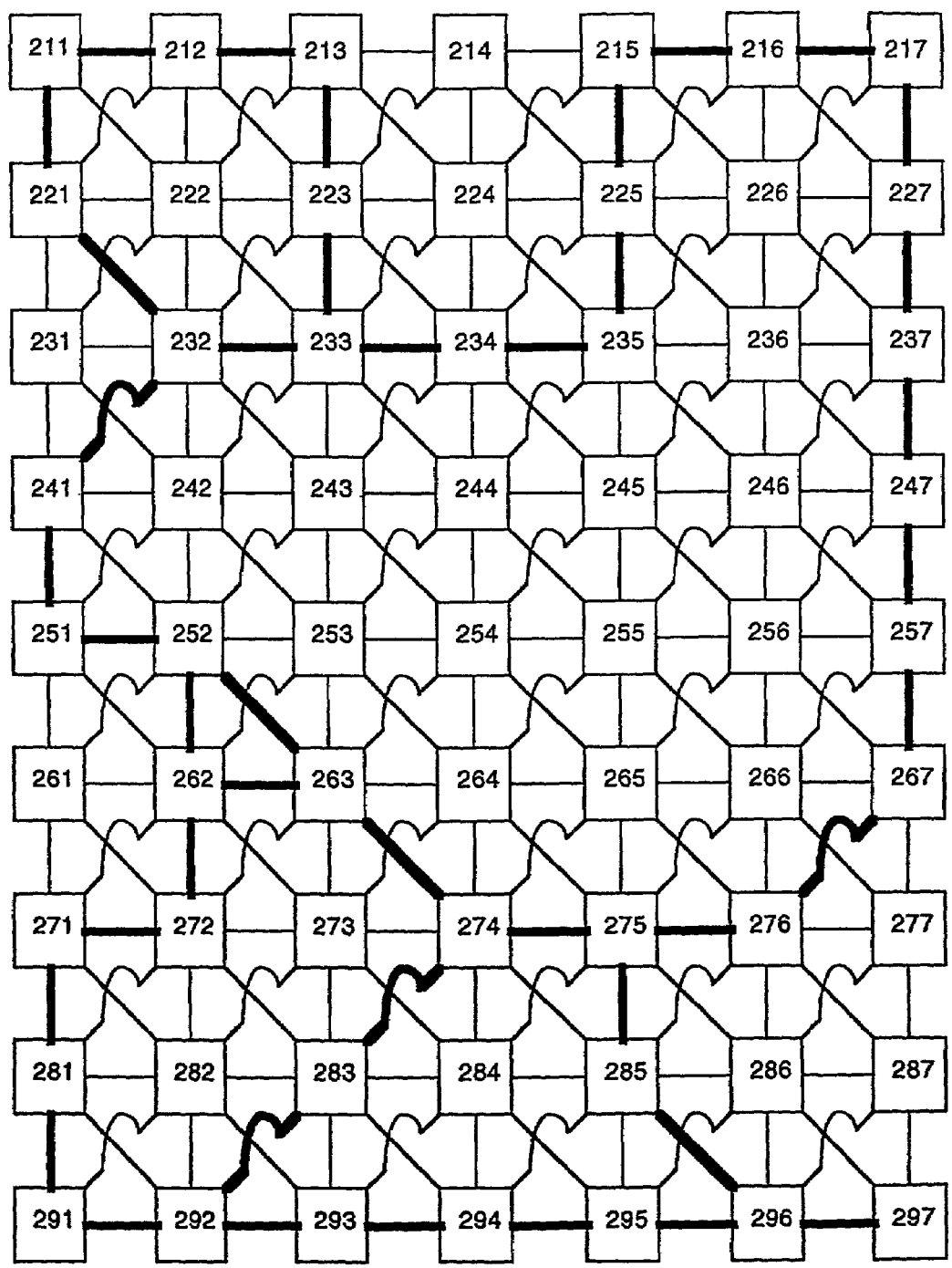
FIG. 2 is a block diagram of one embodiment of a time sensitive quality of service network.

FIG. 2 is a block diagram of time sensitive quality of service network 200. Time sensitive quality of service network 200 comprises intermediate network devices 211 through 297. Each intermediate network device is coupled to its surrounding intermediate network devices and provides a communication of timing dependent information (e.g. real time voice data) to those devices. If the receiving device is busy the receiving device drops the time sensitive information. If the receiving device is not busy the information is transmitted to downstream devices by cut through routing. This approach provides a high quality of service by utilizing the combination of transmitting time sensitive information to downstream devices via cut through routing and dropping time sensitive information if the receiving device is performing other communication activities.

In one embodiment of the present invention, communication of timing dependent information including broadcasting the information to communicatively coupled devices (e.g., communicatively coupled neighboring intermediate network devices). While broadcasting the information repeatedly from a number of intermediate devices to other intermediate network devices may appear to consume significant bandwidth and increase latencies it actually reduces the overall network latencies and improves overall network performance. In one exemplary implementation of the present invention, the broadcast communication attempts result in multiple paths to the source even though the majority of times a rebroadcast is performed it results in an intermediate device dropping the information. The time sensitive information will arrive via the fastest path available without intermediate buffering delays. In addition, determining if an intermediate device is busy before performing the cut through routing and dropping the information if the intermediate device is busy prevents network saturation.

In one embodiment of the present invention each intermediate network device can also function as an end use source or a destination device for information. For example, intermediate network device 211 operates as a source device and initiates a time sensitive information broadcast by broadcasting to intermediate network devices 212, 221 and 222. Intermediate network device 222 is busy and can not rebroadcast within an acceptable amount of time and drops the time sensitive information. Intermediate network devices 221 and 212 are not busy and are able to cut through rebroadcast the time sensitive information within the timing constraints (e.g., immediately since they are not engaged in other communication activities. For example, intermediate network device 221 rebroadcasts the information to intermediate network devices 212, 222, 232, and 231 which in turn rebroadcast the time sensitive information within designated timing constraints. This process of re-broadcasting the information to downstream intermediate network devices and dropping the information if a downstream intermediate device is busy produces a communication path from the destination to the source. For example, one communication path from intermediate device 211 to 297 flows through intermediate devices 221, 232, 241, 251, 252, 263, 274, 275, 285, and 296.

In one embodiment, the present invention is implemented in a transmission control protocol/internet protocol (TCP/IP) environment. Information is communicated in a TCP/IP compatible packet and in one exemplary implementation of the present invention the header of the TCP/IP packet comprises a time sensitive indicator that provides timing constraints information. For example, the header comprises an identification of a destination device and if the device utilizes real time data in its operations the intermediate network system treats the information as having time sensitive constraints (e.g., real time).

FIG. 3 is an block diagram of TCP/IP packet 300 utilized in one embodiment of the present invention. TCP/IP packet 300 comprises physical layer information 301, data link layer information 302, network layer information 303, transport layer information 304, session layer information 305, presentation layer information 306, application layer information 307 and tail information 308. In one embodiment of the present invention, time sensitive quality of service management system analyzes the transport layer information 304 during data link layer processing to determine the address of the end use device. If the end use device is the type of device that typically utilizes time sensitive information, time sensitive quality of service management system processes TCP/IP packet 300 in a cut through broadcast if the time sensitive quality of service management system is not engaged in other communication activities when TCP/IP packet 300 is received. If the time sensitive quality of service management system is engaged in other communication activities when TCP/IP packet 300 is received the time sensitive quality of service management system drops TCP/IP packet 300.

In exemplary implementation of the present invention, data link layer information 302 is modified to include information associated with a final network destination (e.g., an end use device). In this exemplary implementation, a time sensitive quality of service management system analyzes the information in the link layer information 302 during data link layer processing. In one embodiment of the present invention the data link layer information 302 is modified by an originating source to indicate a packet includes time sensitive information and downstream intermediate network devices forward the packet via cut through routing as soon as the intermediate network devices analyze the link layer information and determine the packet includes time sensitive information. In one embodiment of the present invention the time sensitive quality of service management system determines what type of device the end use device is and the address of the end use device. If the end use device is the type of device that typically utilizes time sensitive information, time sensitive quality of service management system processes TCP/IP packet 300 via cut through switching if the time sensitive quality of service management system is not engaged in other communication activities when TCP/IP packet 300 is received. If the time sensitive quality of service management system is engaged in other communication activities when TCP/IP packet 300 is received the time sensitive quality of service management system drops TCP/IP packet 300.

A present invention time sensitive quality of service management system also includes probing path establishment capabilities in one embodiment of the present invention. A present invention quality of service management probing system establishes communication paths utilizing probes and after the communications paths are established the time sensitive information is communicated. Referring again to FIG. 1, in one exemplary implementation of the present invention time sensitive quality of service management system 100 with probing path capabilities sends out a cut through probe comprising a relatively small packet of information to other devices communicatively coupled to time sensitive quality of service management system 100. The cut through probe is forwarded as soon as time sensitive quality of service management system 100 determines it is capable of complying with specified timing constraints for the time sensitive information. For example, time sensitive quality of service management system 100 ignores and drops the probe if time sensitive quality of service management system 100 is busy with another transaction. Time sensitive quality of service management system 100 forwards the probe if it is not busy with another transaction. Time sensitive quality of service system 100 also returns a second probe update packet to an upstream device if it receives a first probe update packet from a down stream device. A probe update packet includes communication path information (e.g., identification of intermediate network devices along a path) that is utilized to establish a path from a source to a destination.

In one embodiment of the present invention, intermediate network devices utilize a cut through only communication path probe to establish a communication path for non-time sensitive information. In one exemplary implementation of the present invention the intermediate network devices do not analyze if a communication probe is associated with time sensitive or not, they just cut through route the communication probe and attempt to establish a communication path that is available for communicating information regardless of whether it is time sensitive or not. For example, an intermediate communication device forwards a communication path probe by cut through routing and a probe update is returned to the originating source establishing a communication path between an originating source and a final destination. The established communication path is utilized to communicate non time sensitive information to the final destination.

Referring again to FIG. 2, intermediate network devices in one embodiment of time sensitive quality of service network 200 include quality of service management probing systems. For example, the communication path from intermediate device 211 to 297 flows through intermediate devices 221, 232, 241, 251, 252, 263, 274, 275, 285, and 296 is established using probes and probe updates. Utilizing cut through routing of probes and probe updates instead of beginning to communicate the time sensitive information enables time sensitive quality of service network 200 to determine if a communication path that meets the timing requirements of the time sensitive information is available. Establishing a communication path with relatively small probes and probe update packets does not tie up time upstream sensitive quality of service network 200 resources communicating time sensitive information that may never reach the destination because a path to the destination is not established.

Time sensitive quality of service network 200 including quality of service management probing systems has a variety of enhancement options that facilitates maximization of network resource utilization. In one embodiment of the present invention, a time sensitive quality of service network leverages previously collected network management information to establish a communication path. In one exemplary implementation of the present invention time sensitive quality of service network utilizes information about a previous downstream path from an intermediate network device to a destination to establish a communication path for a different source. In one embodiment of the present invention, time sensitive quality of service network establishes wormholes to complete communications to a destination. For example, if communication path from device 211 to 297 was previously established through intermediate devices 221, 232, 241, 251, 252, 263, 274, 275, 285, and 296 if device 252 receives another communication packet from a different source (e.g., 243) it knows a potential path to 297 is through 263, 274, 275, 285, and 296 and 252 attempts to send the information along this path. The sooner that 252 establishes the path for communications from 243 after completing the communication from 251 the more likely the downstream devices (e.g., 263, 274, 275, 285, or 296) are still available and not engaged in other communications.

Time sensitive quality of service network 200 also includes other network congestion management features in some embodiments of the present invention. In one embodiment of the present invention, time sensitive quality of service network 200 limits the number of hops information travels between intermediate network devices to reduce inefficient fan-out congestion. In one exemplary embodiment of the present invention in which "worm hole" leverage techniques are utilized the hop to the initial intermediate device (e.g., 252) is counted and the remaining hops to the end of the worm hole chain are not counted (e.g., 263, 274, 275, 285, 296 and 297).

Figure 4A:
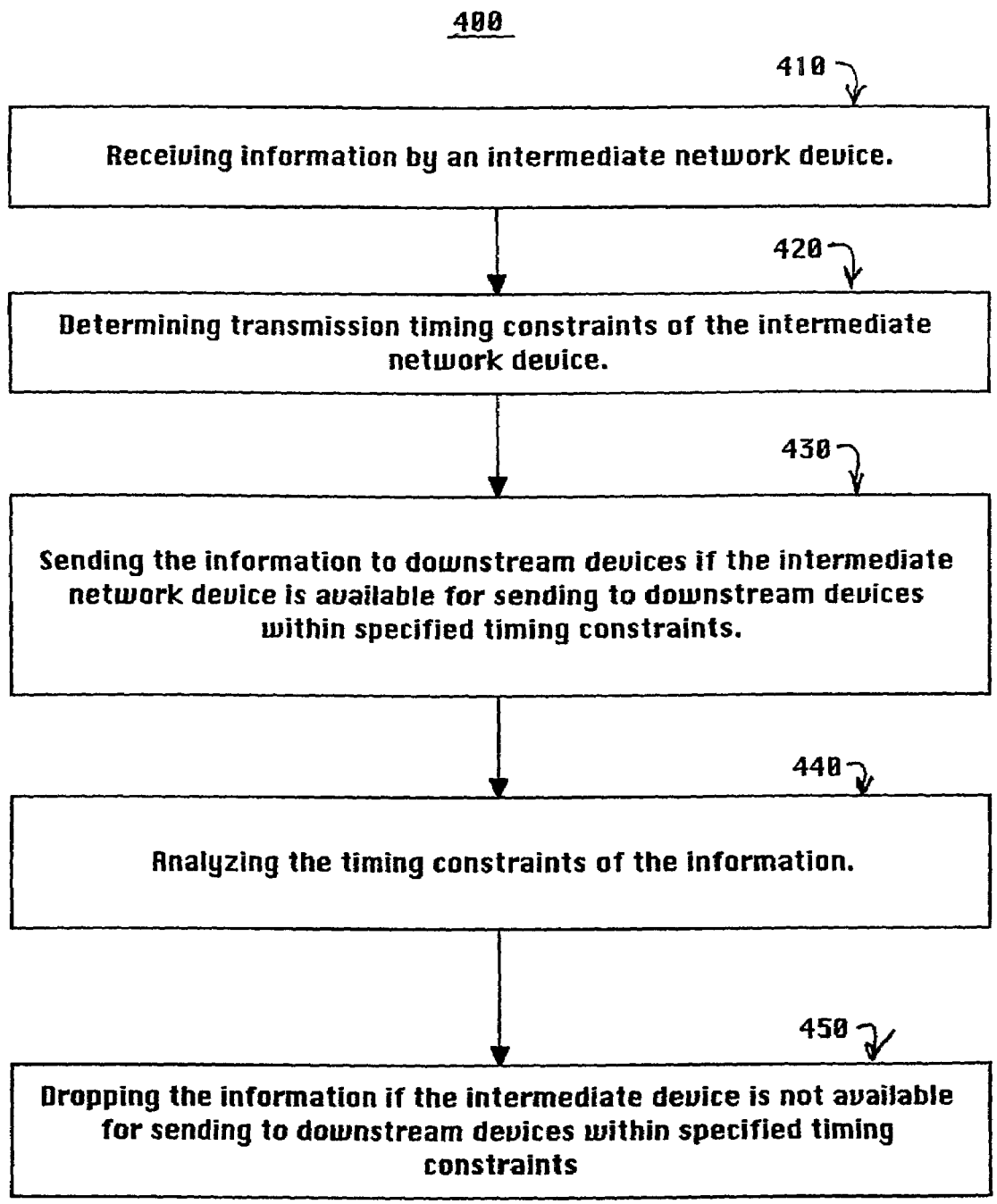
FIG. 4A is a block diagram of one embodiment of a present invention time sensitive quality of service management method.

In one embodiment of the present invention time sensitive quality of service network 200 includes communication link recovery features. In one exemplary implementation of the present invention, time sensitive quality of service network 200 goes into a "hot potato" mode when a communication link is unavailable. If an intermediate network device is receiving information and can no longer communicate the information on a previously designated link (e.g., a proposed link is unavailable because a downstream device is busy or an established link is lost, broken, disconnected, etc.) and the information is not intended for the intermediate network device as the final destination the intermediate network device communicates the information to a randomly selected neighboring second intermediate network device it does have an available link to. The second intermediate device attempts to establish a communication path to the final destination device. In one exemplary implementation of the present invention the second intermediate device utilizes present invention cut-through routing and pre-emption techniques to establish the communication path to the final destination. In one embodiment of the present invention, the intermediate device that lost the communication link to a first intermediate device attempts to sequentially establish a communication path to the final destination through devices it does have a link to. For example, the second destination device responds that it is not able to establish a communication link to the final destination, the intermediate network device that originally lost the link attempts to establish a communication path through a third intermediate network device it has a link to and so on, sequentially attempting to establish a communication path to the final destination FIG. 4A is a block diagram of time sensitive quality of service network management probing method 400, one embodiment of the present invention. Time sensitive quality of service network management method 400 provides high level quality of service characteristics.

In step 410 information is received by an intermediate network device. In one exemplary implementation of the present invention the information is compatible with TCP/IP standards.

In step 420 a determination of transmission timing constraints of the intermediate network device is made. For example, is the intermediate network device engaged in activities associated with a previous communication transaction. In one embodiment of the present invention, the determination is directed to determining if a communication path (e.g., channel) to a downstream device is busy and will be unavailable within specified timing constraints (e.g. immediately).

In step 430 the information is sent to downstream devices by the intermediate network device if the intermediate device is available for sending to downstream devices within specified timing constraints. In one embodiment of the present invention a cut through process is performed to rebroadcast the information. In one exemplary implementation of the cut through process a packet of information is switched to the down stream broadcast links as soon the header indicating the urgency of the information is received and analyzed. In one embodiment of the present invention, time sensitive quality of service network management method 400 limits the number of hops to intermediate network devices time sensitive information makes in route to a final destination.

In one embodiment of the present invention, the information broadcast to downstream devices by the intermediate network device in step 430 is a communication path probe utilized to establish a communication link. In one exemplary implementation of the present invention, a communication probe includes identification of the final destination and the communication path (e.g., identification of the intermediate network devices the probes has traveled through to arrive at whatever point it is in the communication network). In one embodiment of the present invention, if a probe reaches an intended (e.g., identified) final destination a probe update (e.g., indicating a path is available) is returned along the same path the probe traveled. In one embodiment of the present invention, the probe is communicated by cut-through routing. In one exemplary implementation of the present invention a communication path probe is established if probe update information returns to the probe original source. If a communication path is established from the initial source to the final destination, the remaining time sensitive information (e.g., real time information) is communicated along the communication path by cut-through routing.

In step 440 the timing constraints of the information are analyzed by the intermediate device. In one embodiment of the present invention a communication packet header includes a timing constraint indicator. In one embodiment of the present invention information is considered urgent if it is addressed to a port associated with a timing sensitive device (e.g., a real time device).

In step 450 the information is dropped if the intermediate device is not available for sending the information to downstream devices within specified timing constraints.

In one embodiment of time sensitive quality of service network management method 400 the information is buffered and forwarded if the timing constraints indicate the information is not urgent. One embodiment of time sensitive quality of service management method 400 utilizes cut-through switching in a time sensitive quality of service network. If communication information meets predetermined urgency criteria (e.g., real time information) it is cut through a router and rebroadcast or it is dropped. If the information does not meet the predetermined urgency criteria the information is buffered and then forwarded when the intermediate network device is not busy.

In one embodiment of the present invention, time sensitive quality of service network management method 400 utilizes a time sensitive virtual channel communication process to communicate time sensitive information. The time sensitive virtual channel communication process is utilized in step 430 in one exemplary implementation of the present invention. FIG. 4C is a flow chart of time sensitive virtual channel communication process 490, one embodiment of the present invention.

In step 491a time sensitive pre-emption communication link is established via a virtual channel of a communication network. In one embodiment of the present invention, there are a plurality of communication channels in a communication link. In one embodiment of the present invention, at least one of the communication channels is reserved for priority communication information.

In step 492 time sensitive information is cut through routed on the virtual channel. In one embodiment of the present invention the virtual channel is reserved for time sensitive information. In one embodiment of the present invention, the channel is not reserved exclusively for time sensitive information but other information is preempted by time sensitive information communications. For example, a channel may carry non-time sensitive information but when time sensitive quality of service management system 100 receives time sensitive information (e.g., real time information) the time sensitive information pre-empts the non-time sensitive information (e.g., is time sensitive quality of service management system 100 stops communicating the non-time sensitive information) and time sensitive quality of service management system 100 cut through routs on the time sensitive information on the channel.

Figure 4B:
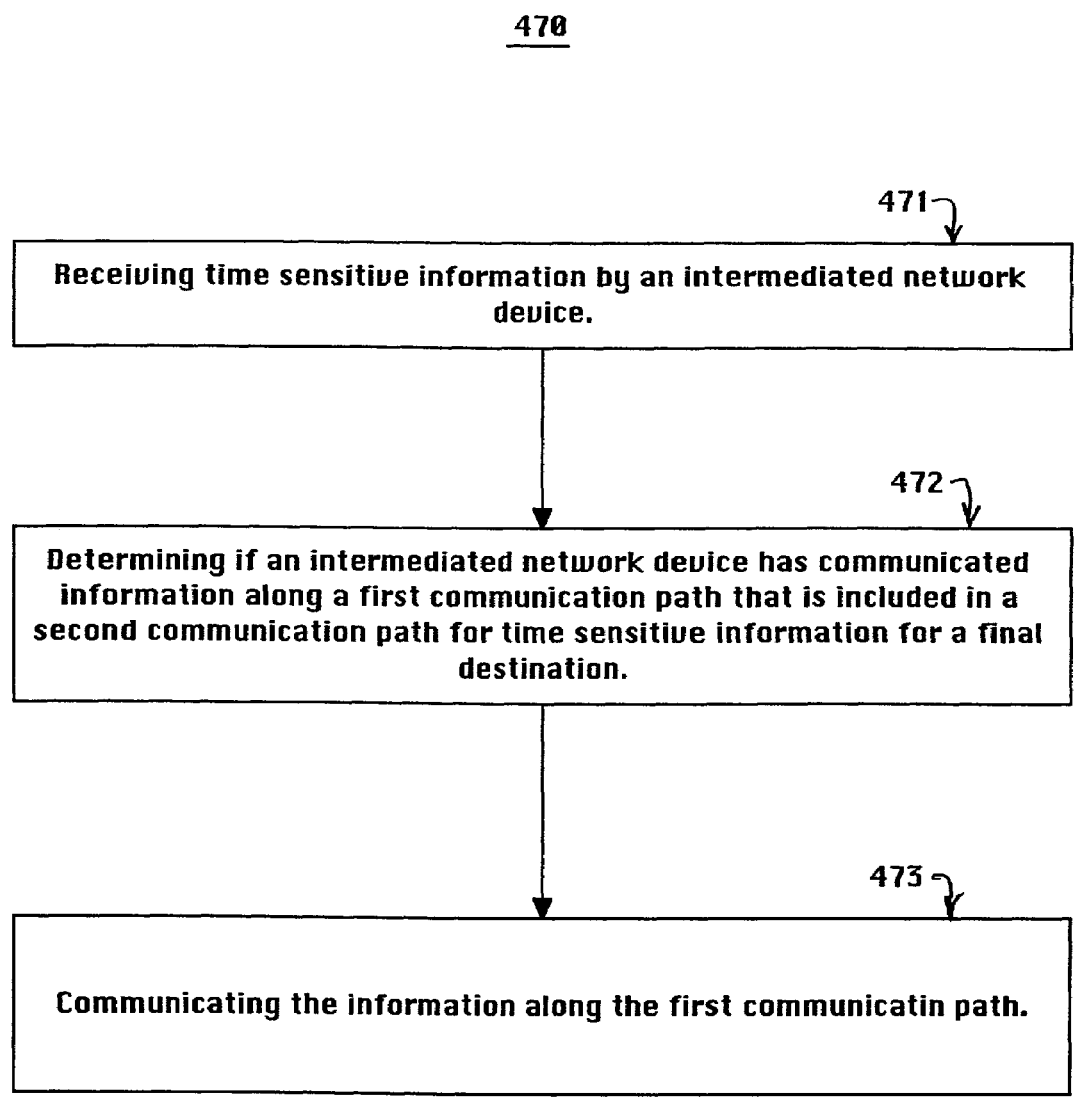
FIG. 4B is a flow chart of a time sensitive communication path leveraging method included in an embodiment of the present invention.

Time sensitive quality of service network management method 400 includes a variety of enhancement options that facilitate maximization of network resource utilization. In one embodiment of the present invention, a time sensitive quality of service network management method leverages previously collected network management information to establish a communication path. FIG. 4B is a flow chart of time sensitive communication path leveraging method 470, one embodiment of the present invention.

In step 471 an intermediate network device receives time sensitive information intended for a final destination.

In step 472 an intermediate network device determines if the intermediate device has communicated information along a first communication path that is included in a second communication path for time sensitive information intended for a final destination.

In step 473 the intermediate network device communicates the information along the first communication path. In one exemplary embodiment of the present invention in which "worm hole" leverage techniques are utilized the hop to the initial intermediate device (e.g., 252) of the first communication path is counted and the remaining hops to the end of the communication path chain are not counted (e.g., 263, 274, 275, 285, 296 and 297).

Figure 5:
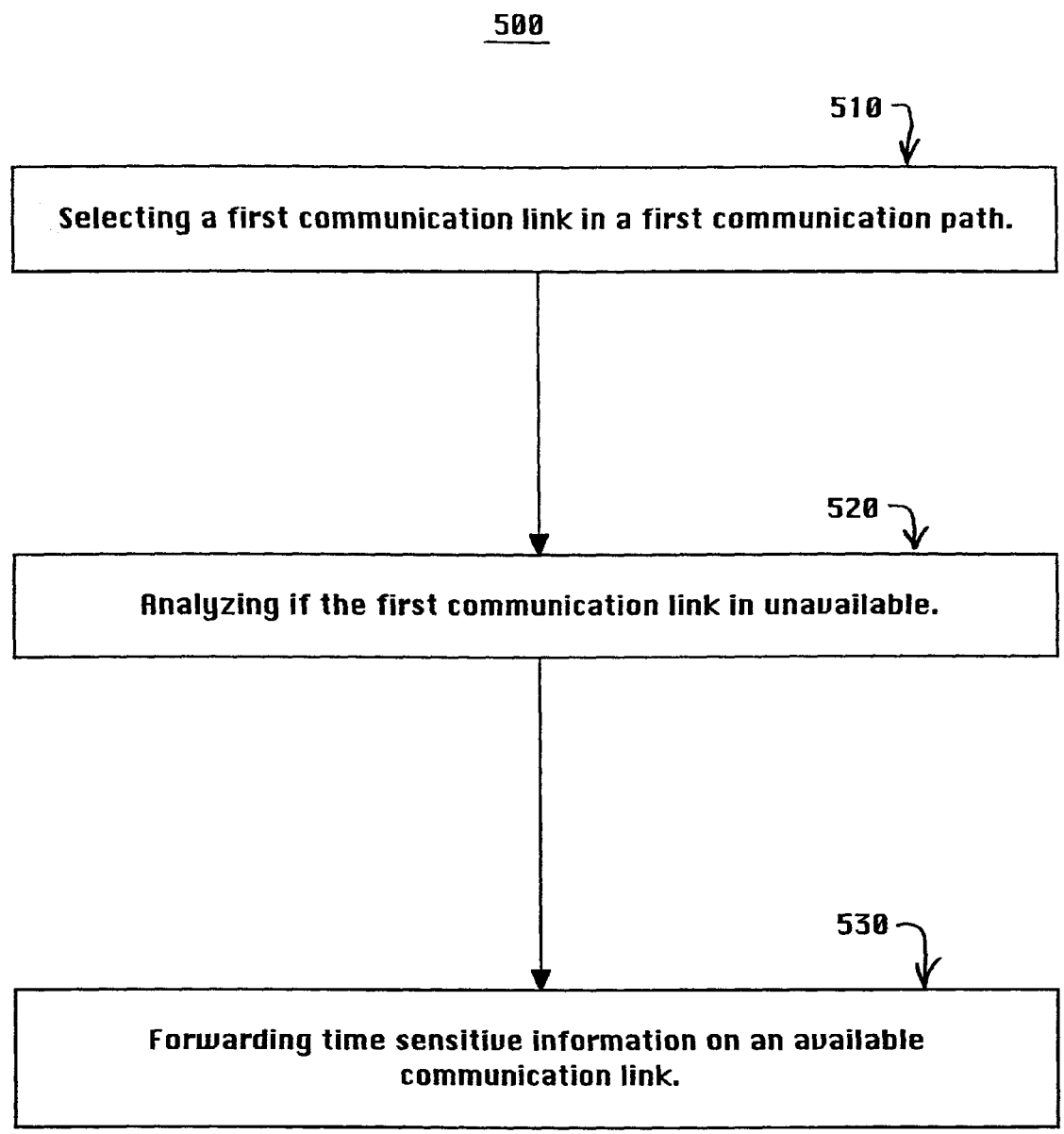
FIG. 5 is a flow chart of a time sensitive communication path recovery process of one embodiment of the present invention.

In one embodiment of the present invention a time sensitive quality of service network management method includes communication path recovery capabilities. In one exemplary implementation of the present invention a time sensitive quality of service network management method is able to establish a new communication path if a previously selected communication link is unavailable. FIG. 5 is a flow chart of time sensitive communication path recovery process 500, one embodiment of the present invention.

In step 510 a first communication link is in a first communication path is selected. In one exemplary implementation of the present invention the first communication path is established between a first intermediate network device and a second intermediate network device. In one embodiment of the present invention, the first communication link is established between a first intermediate network device and a second intermediate network device by time sensitive quality of service network management method 400.

In step 520 the first intermediate network device analyzes if the first communication link with the second intermediate network is unavailable. In one exemplary implementation, time sensitive communication path recovery process 500 determines a previously selected link is unavailable because a downstream intermediate network device is busy. In another exemplary implementation of the present invention, a link in an established communication path is lost, broken, disconnect, etc.

In step 530 the first intermediate communication device forwards time sensitive information to a third intermediate device for which a communication link is available if the communication link with the second intermediate network device is unavailable. In one embodiment of the present invention, the first intermediate communication device forwards a communication path probe and waits for a probe update to return establishing a communication path to the final destination before communicating Thus, the present invention system and method facilitates enhanced end use performance and high quality of service communications. The present invention facilitates the reduction of overall network latencies and improved network performance. The present invention minimizes the wasting of bandwidth on transmission of stale information that is no longer useful. Utilizing cut through routing allows the present invention to avoid delays associated with buffering information during routing and provides fast delivery of the information to meet timing constrains. The fast delivery of information facilitates realization of end use benefits. For example, voice information is not choppy when it is received and is still relevant when it is received (e.g., useful in the context of a conversation flow, if a conversation has already past a particular point past information is not really useful). By dropping information if an intermediate device is previously engaged prevents over saturation and bandwidth conservation. The present invention approach to dropping information prevents bandwidth resources being wasted on transmitting stale and essentially useless information and leaving the bandwidth resources available to communicate other useful information. The present invention provides overall network benefits and increases network productivity.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A time sensitive quality of service management system comprising:
   a communication port for communicating information;
   a switching circuit for providing an output communication path to said communication port and performing unscheduled cut through routing of a communication path probe, wherein said probe is discarded if said unscheduled cut through routing cannot be performed within a time constraint associated with said probe, said switching circuit coupled to said communication port;
   a processor for directing said switching circuit to perform unscheduled cut through routing of said communication path probe and a communication path probe update, including discarding said communication path probe and associated information if said unscheduled cut through routing of said probe cannot be performed within said time constraint, said processor coupled to said switching circuit; and
   a memory for storing information associated with the control of said switching circuit by said processor, said memory coupled to said processor.

2. A time sensitive quality of service management system of claim 1 wherein said processor analyzes incoming information and determines if the incoming information has time sensitive characteristics.

3. A time sensitive quality of service management system of claim 2 wherein said processor directs said time sensitive quality of service management system to drop said incoming information with time sensitive characteristics if said switching circuit can not output said information within specified timing constraints according to said time sensitive characteristics.

4. A time sensitive quality of service management system of claim 2 wherein said processor directs said time sensitive quality of service management system to drop said incoming information with time sensitive characteristics if said switching circuit is busy performing other switching operations.

5. A time sensitive quality of service management system of claim 2 wherein said processor directs said switching circuit to add identification information to said communication path probe and forward said communication path probe by cut-through routing upon receipt and analysis of destination information in said communication probe.

6. A time sensitive quality of service management system of claim 2 wherein said processor directs said switching circuit to forward said communication path probe update upon receipt and analysis of source information in said communication probe update.

7. A time sensitive quality of service management system of claim 2 wherein said communication path probe update includes information utilized to establish a communication path from a source to a destination.

8. A time sensitive quality of service management system of claim 2 wherein said communication path probe is broadcast to communicatively coupled neighboring intermediate network devices.

9. A time sensitive quality of service management system of claim 2 wherein the information is considered urgent if it is addressed to a port associated with a time sensitive device.

10. A network management system comprising:
    a communication port for communicating information;
    a switching circuit for providing an output communication path to said communication port and performing unscheduled pre-emptive cut through routing of information, wherein said information is discarded if said unscheduled pre-emptive cut through routing cannot be performed within a timing constraint associated with said information, said switching circuit coupled to said communication port;
    a processor for directing said switching circuit to perform unscheduled pre-emptive cut through routing of a communication path probe utilized to establish a communication path for communicating non-time sensitive information, wherein said non-time sensitive information is dropped if said unscheduled pre-emptive cut through routing cannot be performed within a timing constraint associated with said non-time sensitive information, said processor coupled to said switching circuit; and
    a memory for storing information associated with the control of said switching circuit by said processor, said memory coupled to said processor.

11. The network management system of claim 10 wherein said processor directs said switching circuit in the performance of a time sensitive quality of service management method comprising:
    receiving information by an intermediate network device;
    determining transmission timing constraints of said intermediate network device;
    sending the information to downstream devices by the intermediate network device via unscheduled pre-emptive cut through routing only, if the intermediate device is available for sending information to downstream devices within specified timing constraints;

analyzing the timing constraints of the information by the intermediate network device; and dropping the information if the intermediate device is not available for sending to downstream devices within specified timing constraints directly via said unscheduled cut through routing.

12. The network management system of claim 10 wherein dropped information is resent from an originating device.

13. The network management system of claim 10 wherein a packet of information is switched to down stream channels as soon header indicating the timing constraints of the information is received and analyzed.

14. The network management system of claim 10 wherein the information is considered urgent if it is addressed to a port associated with a real time device.

* * * * *